United States Patent [19]

Jenzano

[11] 4,155,000
[45] May 15, 1979

[54] BATTERY CELL CONNECTING DEVICE

[76] Inventor: John J. Jenzano, 1815 S. Atlantic Ave., Daytona Beach, Fla. 32018

[21] Appl. No.: 849,893

[22] Filed: Nov. 9, 1977

[51] Int. Cl.² .................... H01M 35/32; B23K 9/28
[52] U.S. Cl. .................... 219/85 F; 429/160; 219/86.1; 219/86.25; 29/731; 136/207
[58] Field of Search ............... 219/85 M, 86.7, 85 F, 219/86.22, 86.25; 429/160; 136/175, 134 R; 164/80, 332, 333, DIG. 1; 29/731; 228/901

[56] References Cited

U.S. PATENT DOCUMENTS

| | | | |
|---|---|---|---|
| 1,410,716 | 3/1922 | Peers | 164/333 X |
| 2,348,884 | 5/1944 | Dewees | 219/85 CA |
| 2,397,052 | 3/1946 | Schietinger | 219/85 CA |
| 2,454,053 | 11/1948 | Galloway | 164/DIG. 1 |
| 2,851,579 | 9/1958 | Pfeiffer | 219/427 |
| 3,320,401 | 5/1967 | Zachry et al. | 219/85 F |
| 3,493,035 | 2/1970 | Tiegel et al. | 429/160 X |
| 3,589,948 | 6/1971 | Adams | 429/160 |
| 3,793,086 | 2/1974 | Badger | 429/160 |

*Primary Examiner*—Arthur T. Grimley
*Assistant Examiner*—M. Paschall
*Attorney, Agent, or Firm*—John N. Randolph

[57] ABSTRACT

An apparatus for use in connecting adjacent cells of storage batteries electrically and mechanically by passing an electric current through electrical resistance elements to cause a rapid heating of said elements and of battery terminal parts disposed in engagement therewith.

7 Claims, 10 Drawing Figures

U.S. Patent   May 15, 1979   Sheet 1 of 2   4,155,000
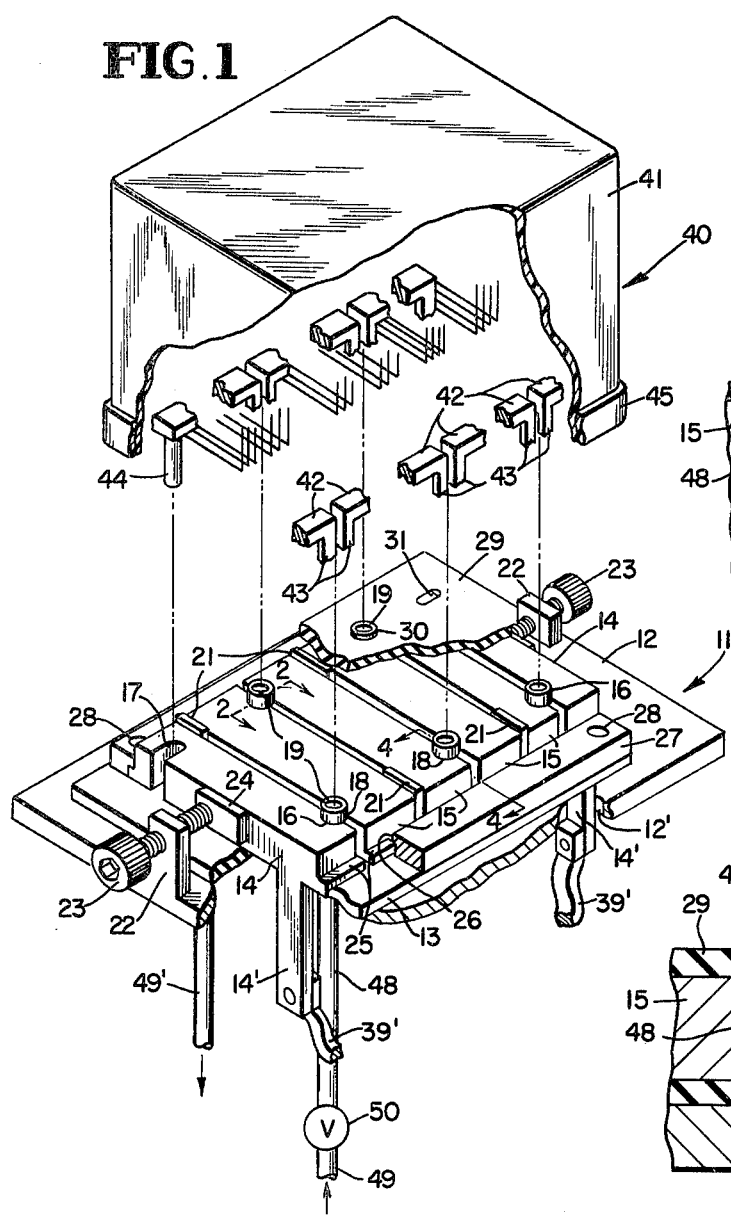
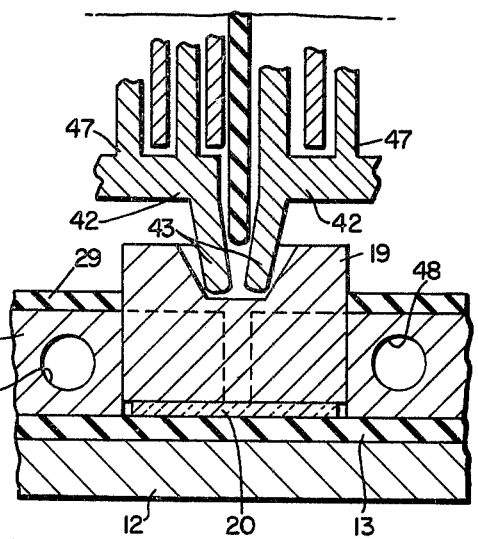
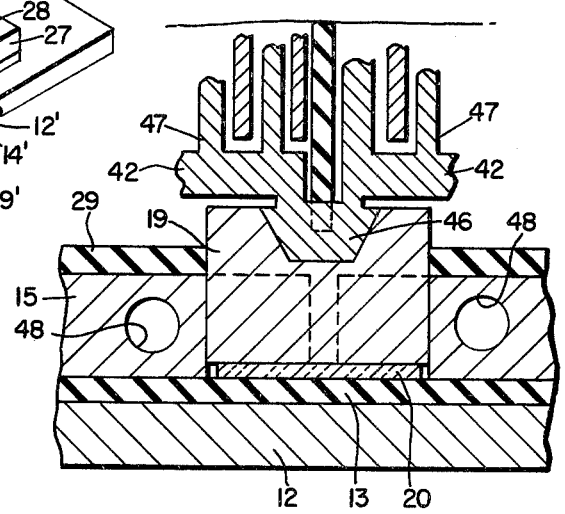
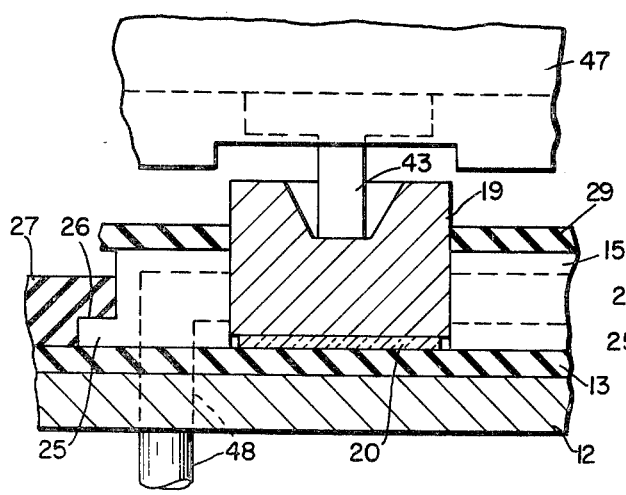
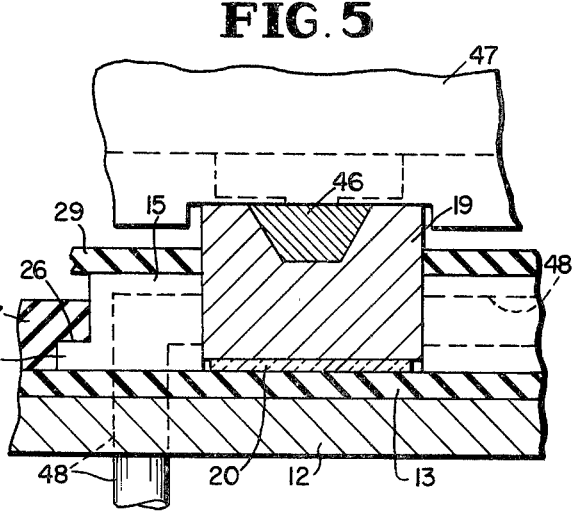

4,155,000

BATTERY CELL CONNECTING DEVICE

BACKGROUND OF THE INVENTION

At the present, in the manufacture of storage batteries the cell terminals are fused together using a torch or by resistance welding. Lead particles originating at and released from the cell terminals, during the fusing operation, fall into the cells and cause short circuits which substantially reduce the battery life.

SUMMARY

It is a primary object of the present invention to provide an apparatus in connection with the use of which a storage battery being manufactured can be disposed in an inverted position while the cells are being electrically and mechanically connected, thereby avoiding the possibility of any lead particles being deposited in the cells.

Another object of the invention is to provide an apparatus by the use of which cell terminals of opposite polarities will be quickly and easily joined electrically and mechanically in an "over-the-wall" connection.

A further object of the invention is to provide an apparatus having means for effecting a quick cooling of the fused joints thereby hastening the manufacturing operation.

Various other objects and advantages of the invention will hereinafter become more fully apparent from the following description of the drawings, illustrating presently preferred embodiments thereof, and wherein:

BRIEF DESCRIPTION OF THE DRAWINGS

FIG. 1 is a fragmentary perspective view partly in plan and partly in section of the battery cell connecting device and showing portions of a storage battery, being manufactured, disposed in an inverted position thereabove;

FIG. 2 is an enlarged fragmentary sectional view taken substantially along a plane as indicated by the line 2—2 of FIG. 1 but with portions of the battery lowered relative to the position thereof in FIG. 1;

FIG. 3 is an enlarged sectional view similar to FIG. 2 but showing the battery parts after fusing of the terminals;

FIG. 4 is a view similar to FIG. 2 but taken at a right angle thereto, substantially along a plane as indicated by the line 4—4 of FIG. 1;

FIG. 5 is a view corresponding to FIG. 4 but showing the cell terminals after having been fused;

DESCRIPTION OF THE PREFERRED EMBODIMENT

Figure 6:
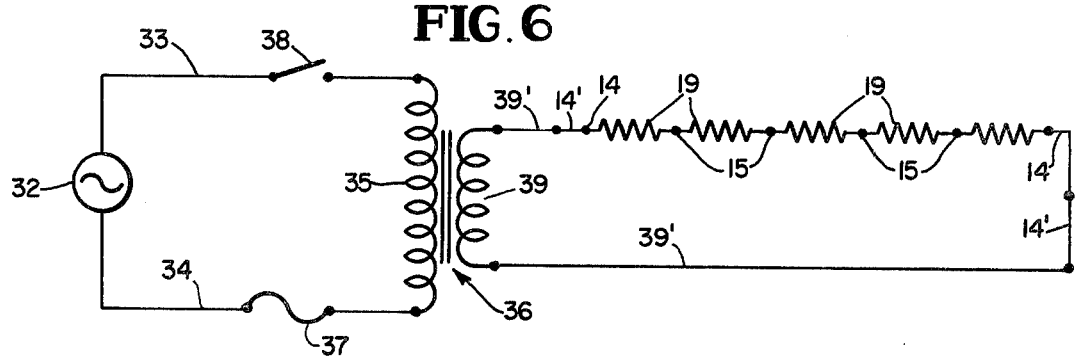
FIG. 6 is a diagramatic view illustrating the electric circuit of the connecting device.

Referring more specifically to the drawings and first with reference to FIGS. 1 to 6, the battery cell connecting device in its entirety and comprising the invention is designated generally 11 and includes a base plate 12 on which is disposed a mat 13 of electrical insulating material. Six electrical conductor bars are shown resting on the mat 13 including end bars 14 and intermediate bars 15, each bar 14, near one end thereof, has a vertically disposed substantially semi-circular recess 16 in its inner face and a deep vertically disposed notch 17, near its opposite end and which opens outwardly of its outer face. Each of the bars 15 has a notch 18 in each side face thereof and which notches are located near opposite ends of the bars 15. Crucibles 19 are mounted in aligned recesses 16 and 18 and rest upon discs 20 of heat insulating material, which rest in turn upon the mat 13. Blocks 21 of electrical insulating material are disposed between the bars, remote from the crucibles 19.

Posts 22 extend upwardly from the ends of the plate 12 and have threaded bores to receive clamping screws 23 which extend inwardly therefrom. The inner ends of the screws 23 abut against blocks 24 of electrical insulating material which, in turn, abut against the outer faces of the bars 14, so that said screws 23 will not form electrical connectors between the bars 14 and plate 12.

As seen in FIG. 1, the bars 14 and 15 have outwardly extending end lips 25 which project from the bottom portions thereof and which engage under ledges 26 of retaining bars 27 of insulating material which rest on the mat 13 and which may be secured by fastenings 28 detachably to the plate 12. A cover plate 29 is disposed over the bars 14 and 15 and has openings 30 through which the crucibles 19 project, the elongated openings 31 which register with the notches 17. Cover plate 29 is also formed of electrical insulating material.

FIG. 6 illustrates an electric circuit which may be utilized with the connecting device 11 and which includes an alternating current power source 32 connected by conductors 33 and 34 to the primary winding 35 of a transformer 36. Fuse 37 is interposed in the conductor 34 and a switch 38 is interposed in the conductor 33. The two ends of the secondary winding 39 of the transformer 36 are connected to depending extensions 14' of the two conductor bars 14 by conductors 39'. Extensions 14' extent through enlarged openings 12' of plate 12 and mat 13.

A portion of a conventional storage battery 40, which is in the process of being manufactured, is shown in FIG. 1, including a case 41, cell parts 42, cell connectors 43 which depend from the cell parts 42, and one of the terminals 44. The battery parts are shown in FIG. 1 in an inverted position and a clamping band 45 is shown disposed around a normally open top of the case 41 for clamping the battery parts therein. The battery 40 is lowered from its position in FIG. 1 so that the pairs of cell connectors 43, one of which pairs is shown in FIG. 2, will enter the cavities of the crucibles 19 and the terminals 44 will enter notches 17, through openings 31. The switch 38 is then closed causing current to flow through the primary winding 35 producing a strong magnetic field across secondary winding 39 thereby causing an induced current to flow through the bars 14 and 15 and the crucibles 19. Since the crucibles 19 are formed of a material that resists the flow of electricity, such as carbon, said crucibles will be quickly heated for melting and fusing the pairs of connectors 43 disposed therein to form rigid mechanical and electrical joints 46, as seen in FIGS. 3 and 5, between the two battery cells 47 of which said connectors 43 form parts.

A conduit 48 has one end 49 leading from a source of supply of water or other cooling liquid and in which is interposed a valve 50. Conduit 48 extends through the bars 14 and 15 so as to straddle the crucibles 19, as seen in FIGS. 2 to 5. Hoses, not shown, connect parts of the conduit 48 between the bars. After the joints 46 have been formed, switch 38 is turned off and valve 50 is opened to allow the chilling liquid to pass through the conduit 48 for quickly cooling the crucibles 19 to a temperature below the melting point of the joints 46, which are thus immediately frozen to form permanent electrical and mechanical connections between the battery cells 47. The chilling liquid is discharged to waste through conduit end 49'. The battery 40 can then be immediately removed from the apparatus 11 and inverted back into an upright position after which the clamping band 45 can be removed. The apparatus 11 is then ready for completing the manufacture of another battery in the same manner as heretofore described.

Figure 7:
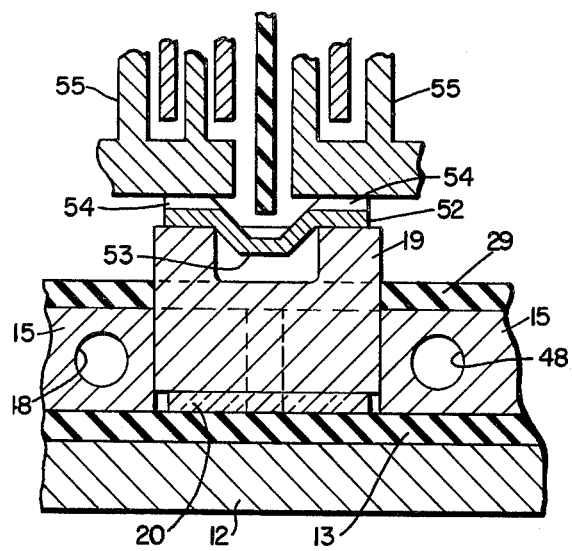
FIG. 7 is a view similar to FIG. 2 but illustrating a modification of the battery cell connectors.
Figure 8:
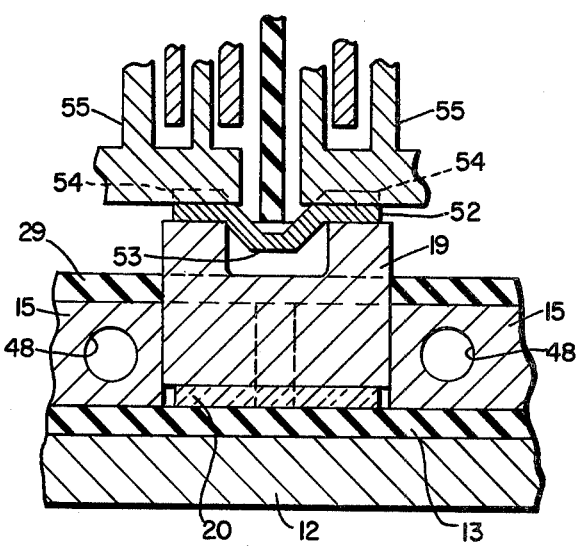
FIG. 8 is a view similar to FIG. 3 showing the cell connectors of FIG. 7 fused to two adjacent cells.

FIGS. 7 and 8, which correspond with FIGS. 2 and 3, illustrate a slight modification of the battery connection wherein the connectors 43 are omitted. Instead, a metallic bar 52 is laid across each crucible 19. The bar has a downwardly offset intermediate portion 53 which extends into the cavity of the crucible, and upstanding side edge portions 54 at its ends on which parts of the battery cells 55 rest. When the crucibles 19 are heated, as previously described, the end portions of each bar 52 fuse with the cell parts resting thereon, with their upturned portions 54 becoming imbedded in said cell parts.

Figure 9:
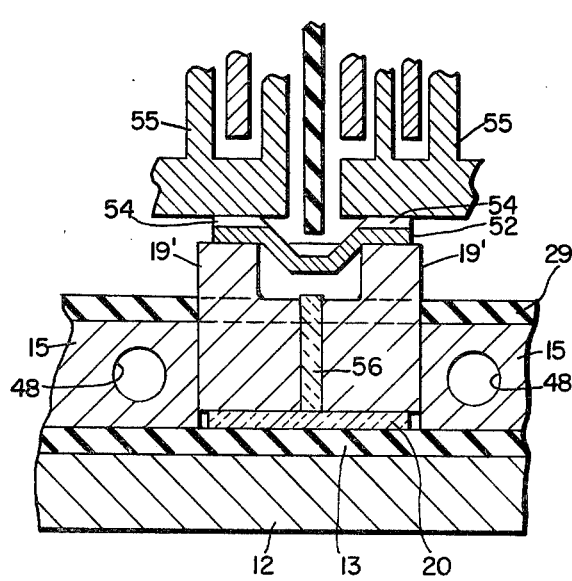
FIG. 9 is a view similar to FIG. 7 but illustrating another modification of the cell connecting device of FIGS. 1 to 5.
Figure 10:
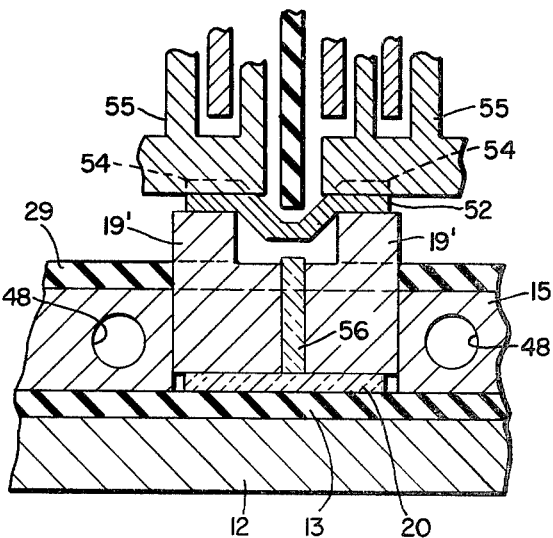
FIG. 10 is a view similar to FIG. 8 showing the two cells of FIG. 9 electrically and mechanically connected.

FIGS. 9 and 10 differ from FIGS. 7 and 8 only in that each crucible is composed of corresponding halves 19' separated by an insert 56 of electrical insulating material. When the bars 14 and 15 have an electric current passed therethrough, each bar 52 will form a conductor bridge across the two halves 19' of the crucible on which said bar rests. Each bar then becomes a conductor and heat is generated at the points where it contacts the crucible segments 19' and the parts of the cells 55 for producing a joint in the same manner as heretofore described in connection with FIGS. 7 and 8.

Various other modifications and changes are contemplated and may be resorted to, without departing from the function or scope of the invention.

I claim as my invention:

1. A storage battery cell connecting device comprising a base, a plurality of electrical conductor bars supported on said base in electrically insulated relation to one another, resistance means each consisting of a crucible having portions mechanically engaging and electrically connecting adjacently disposed bars, said resistance means being adapted to be engaged by parts of adjacent cells of a storage battery, and an electric circuit in which said bars and resistance means are interposed whereby when a current is passed through said circuit the cell parts engaged by each of the resistance means will be fused together to form an electrical and mechanical joint.

2. A storage battery cell connecting device as in claim 1, each such crucible being adapted to receive a pair of connector elements of adjacent battery cells to be fused together when the electric current is passed through the crucibles.

3. A storage battery cell connecting device as in claim 2, and means for passing a chilling liquid around each of the crucibles, after the electric circuit has been deenergized, for rapidly cooling and hardening the fused joints.

4. A storage battery cell connecting device as in claim 2, and insulator elements interposed between said bars and cooperating with the crucibles for retaining the bars in spaced apart relation to one another.

5. A storage battery cell connecting device as in claim 2, said crucibles having upwardly opening cavities to receive the pairs of cell connectors with the battery disposed in an inverted position.

6. A storage battery cell connecting device as in claim 1, a metallic bar interposed between the crucible and a pair of adjacent battery cells and in contact with each crucible and cells whereby when an electric current is passed through the crucibles each bar will be heated and fused to the two cells engaged thereby.

7. A storage battery cell connecting device as in claim 1, each crucible consisting of a pair of electrical resistance elements each in contact with a single bar, electrical insulating means interposed between the resistance elements of each pair, and a metallic bar bridging said resistance elements and in contact with adjacent battery cells whereby when an electric current is passed through said resistance elements and bar, the bar will be heated and fused to the cell parts engaged thereby.

* * * * *